Jan. 8, 1929.

A. W. HONYWILL, JR 1,698,097

STEAM TRAP

Filed Dec. 29, 1924

Inventor
Albert W. Honywill Jr.

By Whittemore Hulbert Whittemore Belknap.

Attorneys

Patented Jan. 8, 1929.

1,698,097

UNITED STATES PATENT OFFICE.

ALBERT W. HONYWILL, JR., OF DETROIT, MICHIGAN.

STEAM TRAP.

Application filed December 29, 1924. Serial No. 758,761.

The invention relates to steam traps and refers more particularly to means for quickly renewing the valve or valve seat or both thereof. Further features of my invention include the provision of a simple and efficient arrangement for readily replacing the valve or valve seat or both, the arrangement being such that the repair parts are readily available. The invention also includes a reversible and rotatable valve carrying member in combination with a reversible and rotatable valve seat disc.

While I have shown my invention applied to a steam trap it should be understood that it may be used and is within the contemplation of my invention, in connection with other devices where renewable valves or valve seats are desired.

With these and other objects in view, the invention resides in the novel features of construction and combination and arrangements of parts as more fully hereinafter described and claimed.

Referring to the drawings:—

Figure 1:
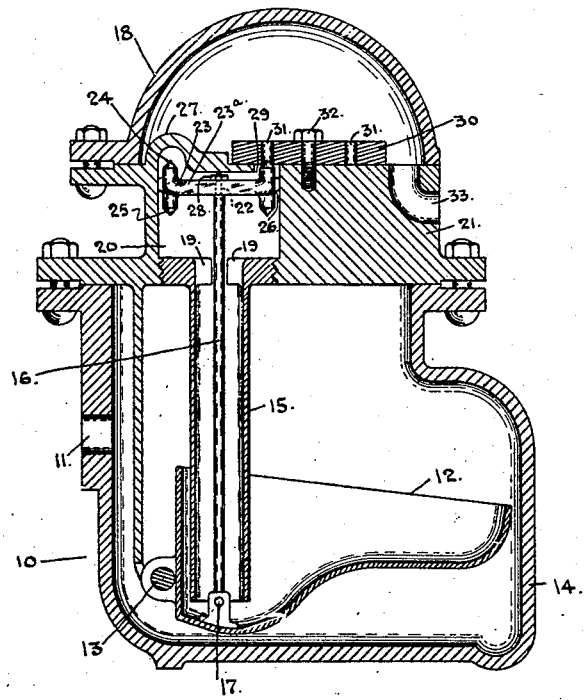
Figure 1 is a sectional elevation showing one form of my invention applied to a steam trap.
Figure 2:
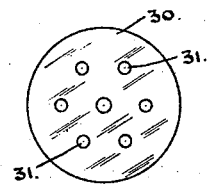
Figure 2 is a plan of the valve seat disc.

In the drawings, reference character 10 indicates a steam trap of which 11 is the inlet, 12 is the bucket pivoted at 13 to the body portion 14, 15 is the outlet pipe, and 16 is the valve rod pivoted at 17 to the bucket 12, all of which parts may be the usual or any suitable construction.

Secured to the upper part of the cover 21, as by bolts, is a cap 18.

The upper part of the outlet pipe 15 may be formed with projections 19 for maintaining proper alignment of the valve rod 16. The upper end of the valve rod projects into a chamber 20 formed within the cover 21, the rod 16 being preferably formed with a reduced portion 22 adapted to rotatably receive the valve carrying member 23. The latter member comprises a plurality of arms 23ª extending radially from the axis of the rod 16, the outer ends of the arms being formed with oppositely extending valve seat engaging elements or valve points 24 and 25 respectively. The extremities of the arms 23ª may be formed with projecting surfaces 26 adapted to engage the vertical walls of the chamber 20 for assisting in maintaining the valve in proper position. The cover 21 is formed with the upper wall 27 arched to accommodate rotation of the upper valve points 24. A nut 28 serves to hold the valve carrying member 23 fixed to the rod 16 in any position of rotative adjustment of member 23. Furthermore, by removing the nut 28 the member 23 may be reversed to bring valve points 25 selectively into registry with the valve seat to be hereinafter described.

The chamber 20 is provided with outlet 29 and the passage of steam and fluid therethrough is controlled by a valve seat member such as the disc 30 provided with a plurality of circumferentially arranged valve seats 31 adapted to be selectively brought into alignment with the outlet 29 by reason of a pivotal screw bolt 32 secured to the cover 21. The disc is also preferably reversible by removing the screw bolt 32 and reversing the disc. 33 indicates the outlet from the cap 18.

The member 23 is adapted to be rotated only on disassembly of the valve member with respect to the steam trap. The arrangement could, of course, be readily modified to permit rotation of the member 23 in the assembled condition of the parts, but as shown it is preferred to disassemble the valve member before rotating the same to bring one of the valve points into position for operative engagement with one of the valve seats.

From the foregoing description, it will be apparent that I have provided means for quickly and conveniently renewing a worn valve point or valve seat or both. Also, by the arrangement including the rotatable valve carrying member, and the rotatable valve disc, a large number of renewable valve points and seats are incorporated in the construction. This number of available renewable parts is further increased by arranging the valve carrying member and the valve seat disc reversible. It is therefore, apparent that any of the valve points may be selectively brought into registration with any of the valve seats, the nut 28 and the screw bolt 32 respectively permitting the selective positioning of these parts.

It is understood that the steam trap may operate in the customary manner, the inlet 11 serving to periodically fill the bucket 12 which is tilted on its pivot 13, causing the valve rod 16 to be moved downwardly to permit discharge from the bucket 12 upwardly through the outlet pipe 15, chamber 20, outlet 29, valve seat 31 and outlet 33.

Figure 3:
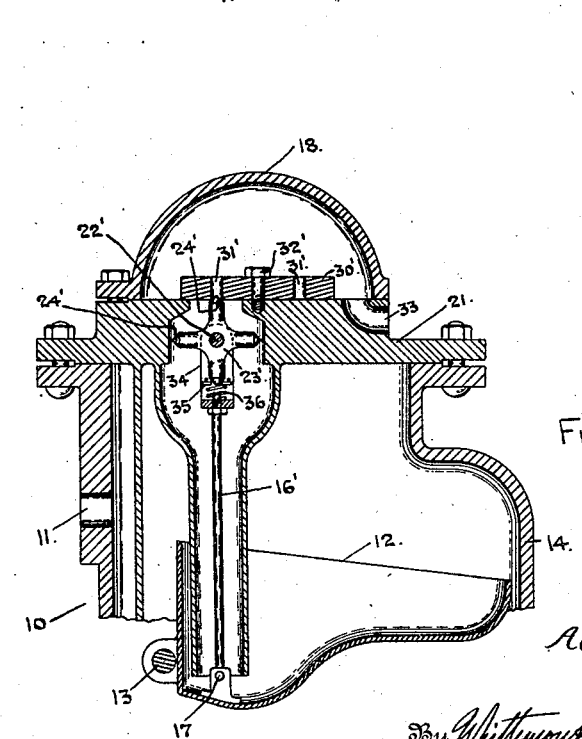
Figure 3 is a fragmentary elevation showing a modified arrangement of the valve carrying member.

Referring to Figure 3, I have shown a modified construction of valve carrying member. In this embodiment, the valve rod 16' terminates in a yoke 34 to which is rotatably pivotally mounted at 22', the valve carrying member 23' having a plurality of valve points 24' adapted to be selectively aligned with the valve seats 31' of the valve disc 30' which is pivoted at 32' and may function in a manner corresponding to that of the valve disc 30 described above.

For holding any one of the valve points 24' in proper alignment with one of the valve seats 31' and at the same time permitting selective rotation of the valve carrying member 23', I have provided the snap lock device 35 urged upwardly by spring 36.

While I have shown my invention applied to a steam trap it is obvious that it may be used in other devices wherever renewable valve points or seats are desired.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. In a valve construction, the combination with a pivoted valve seat member provided with a plurality of valve seats, of a rod, a valve carrying member provided with a plurality of valve seat engaging elements, said member being movably mounted on said rod, and means permitting selective movement of the said valve seat member about its said pivot and the said valve carrying member whereby any of said valve seats may be registered with any of said valve seat engaging elements.

2. In a valve construction, the combination with a rotatable valve seat member provided with a plurality of valve seats, of a rod, a valve carrying member provided with a plurality of valve seat engaging elements, said member being rotatably mounted on said rod, and means permitting selective rotation of the said valve seat member and the said valve carrying member whereby any of said valve seats may be registered with any of said valve seat engaging elements.

3. In a valve construction, the combination with a reversible disc-like valve seat member provided with a plurality of spaced valve seats on each of its opposite faces respectively, of a rod, a valve carrying member provided with a plurality of valve seat engaging elements, said member being reversibly mounted on said rod, and means permitting selective reversing of said valve seat member and the said valve carrying member whereby any of said valve seats may be registered with any of said valve seat engaging elements.

4. In a valve construction, the combination with a rotatable and reversible valve seat member provided with a plurality of valve seats spaced from the axis of rotation of said member, of a rod, a valve carrying member provided with a plurality of valve seat engaging elements, said member being rotatably and reversibly mounted on said rod, and means permitting selective rotation and reversing of the said valve seat member and the said valve carrying member whereby any of said valve seats may be registered with any of said valve seat engaging elements.

5. In a valve construction, the combination with a rotatable and reversible valve seat member provided with a plurality of valve seats on each side of said member, of a rod, a valve carrying member provided with a plurality of valve seat engaging elements, said member being rotatably mounted on said rod, and means permitting selective movement of the said valve seat member and the said valve carrying member whereby any of said valve seats may be registered with any of said valve seat engaging elements.

6. In a valve construction, the combination with a rotatable and reversible valve seat member provided with a plurality of valve seats on each side of said member, of a rod, a valve carrying member provided with a valve seat engaging element, said member being mounted on said rod, and means permitting selective movement of said valve seat member whereby any of said valve seats may be registered with said valve seat engaging element.

7. In a valve construction, the combination with a rotatable valve seat member provided with a plurality of valve seats spaced from the axis of rotation of said member, of a rod, a valve carrying member provided with a valve seat engaging element, said member being mounted on said rod, and means permitting selective movement of said valve seat member whereby any of said valve seats may be registered with said valve seat engaging element.

8. In a valve construction, the combination with a reversible valve seat member provided with a plurality of circumferentially arranged valve seats, of a rod, a valve carrying member provided with a plurality of valve seat engaging elements, said member being rotatably and reversibly mounted on said rod, and means permitting selective movement of the said valve seat member whereby any of said valve seats may be registered with any of said valve seat engaging elements.

9. In a valve construction, the combination with a reversible valve seat member provided with a plurality of valve seats on each side of said member, of a rod, a valve carrying member provided with a plurality of valve seat engaging elements, said member being reversibly mounted on said rod, and means permitting selective movement of the said valve seat member and the said valve carrying member whereby any of said valve seats may be registered with any of said valve seat engaging elements.

10. In a valve construction, the combination with a reversible valve seat member provided with a plurality of valve seats on each side thereof, of a rod, a valve carrying member provided with a valve seat engaging element, said member being mounted on said rod, and means permitting selective movement of said valve seat member whereby any of said valve seats may be registered with said valve seat engaging element.

11. In a valve construction, the combination with a movable valve member having a plurality of seat engaging elements, of a pivoted element provided with a plurality of seats adapted for selective engagement by one of the seat engaging elements of the valve member upon rotation of the said element about its pivot.

12. In a valve construction, the combination of a valve carrying member provided with a plurality of rotatable seat engaging elements, and an element provided with a plurality of seats adapted upon movement of said element to be aligned with one of the seat engaging elements of said valve member for selective engagement therewith.

13. In a valve construction, the combination with a rotatable valve seat member provided with a plurality of valve seats, of a rotatable valve carrying member provided with a plurality of valve seat engaging elements, and means permitting selective movement of said valve seat member and the said valve carrying member whereby any of said valve seats may be registered with any of said valve seat engaging elements.

14. In a valve construction, the combination with a valve seat, of a rod, a valve carrying member provided with radially extending arms, each of said arms having oppositely directed valve seat engaging elements projecting therefrom, said member being rotatably and reversibly mounted on said rod to permit selective engagement of said valve engaging elements with said valve seat.

In testimony whereof I affix my signature.

ALBERT W. HONYWILL, Jr.